United States Patent
Buechner et al.

(10) Patent No.: US 8,627,263 B2
(45) Date of Patent: Jan. 7, 2014

(54) GATE CONFIGURATION DETERMINATION AND SELECTION FROM STANDARD CELL LIBRARY

(75) Inventors: Thomas Buechner, Weil im Schoenbuch (DE); Markus Buehler, Weil im Schoenbuch (DE); Markus Olbrich, Langenhagen (DE); Philipp Panitz, Schoenaich (DE); Lei Wang, Hannover (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/365,989

(22) Filed: Feb. 3, 2012

(65) Prior Publication Data

US 2012/0216168 A1    Aug. 23, 2012

(30) Foreign Application Priority Data

Feb. 23, 2011    (EP) .................................. 11155645

(51) Int. Cl.
*G06F 17/50*    (2006.01)

(52) U.S. Cl.
USPC ............ 716/135; 716/132; 716/133; 716/134

(58) Field of Classification Search
USPC .................................. 716/132, 133, 134, 135
See application file for complete search history.

(56) References Cited

U.S. PATENT DOCUMENTS

| | | | |
|---|---|---|---|
| 5,847,966 A | 12/1998 | Uchino et al. | |
| 6,557,151 B1 | 4/2003 | Donath et al. | |
| 8,407,654 B2 * | 3/2013 | Buechner et al. ............. | 716/133 |
| 2004/0060022 A1 | 3/2004 | Allen et al. | |
| 2012/0216160 A1 | 8/2012 | Buechner | |
| 2012/0266120 A1 | 10/2012 | Buechner et al. | |

FOREIGN PATENT DOCUMENTS

WO    2010004668    1/2010

OTHER PUBLICATIONS

"Dynamic Power Reduction in Flash FPGAs", Actel Mar. 2009, 23 pages.

Agrawal, Vishwani D. et al., "Digital circuit design for minimum transient energy and a linear programming method", VLSI Design, 1999. Proceedings. Twelfth International Conference on Jan. 7-10, 1999, pp. 434-439.

Alexander, Jins D. et al., "Algorithms for Estimating Number of Glitches and Dynamic Power in CMOS Circuits with Delay Variations", 2009 IEEE Computer Society Annual Symposium on VLSI May 13-15, 2009, 6 pages.

(Continued)

*Primary Examiner* — Sun Lin
(74) *Attorney, Agent, or Firm* — DeLizio Gilliam, PLLC

(57) ABSTRACT

A method comprises determining gate configuration from a standard cell library for optimizing behavior of a logic gate in an electronic circuit to be resized. The determining includes defining variables for the logic gate to be resized and defining nets influenced by the logic gate to be resized. The determining includes determining constraints relative to other logic gates in the electronic circuit affected by the logic gate to be resized and formulating objective function. The determining includes solving the objective function using a linear programming solver based on the defined variables and the determined constraints. The determining includes outputting solving of the objective function obtained by linear programming solver for further processing. The gate configuration is selected from the standard cell library for optimizing behavior of the logic gate to be resized based on solving of the objective function.

16 Claims, 4 Drawing Sheets

(56) References Cited

OTHER PUBLICATIONS

Alexander, Jins D. et al., "Computing Bounds on Dynamic Power Using Fast Zero-Delay Logic Simulation", System Theory, 2009. SSST 2009. 41st Southeastern Symposium Mar. 15-17, 2009, pp. 107-112.

Berkelaar, Michel R. et al., "Gate sizing in MOS digital circuits with linear programming", Design Automation Conference, 1990. EDAC. Proceedings of the European http://ieeexplore.ieee.org/stamp/stamp.jsp?arnumber=136648 (Obtained from the Internet on Dec. 21, 2011) Mar. 12-15, 1990, pp. 217-221.

Ding, Chih-Shun et al., "Gate-level power estimation using tagged probabilistic simulation", Computer-Aided Design of Integrated Circuits and Systems, IEEE Transactions on http://ieeexplore.ieee.org/stamp/stamp.jsp?tp=&arnumber=736184 (Obtained from the Internet on Dec. 21, 2011) Nov. 2009, pp. 1099-1107.

English, T. et al., "HotSpot : Visualizing Dynamic Power Consumption in RTL Designs", Sep. 20, 2010, pp. 45-48.

Hu, Fei et al., "Input-specific Dynamic Power Optimization for VLSI Circuits", Low Power Electronics and Design, 2006. ISLPED'06. Proceedings of the 2006 International Symposium on http://ieeexplore.ieee.org/stamp/stamp.jsp?arnumber=4271842 (Obtained from the Internet on Dec. 21, 2011) Oct. 4-6, 2006, pp. 232-237.

Najm, F. N. et al., "An extension of probabilistic simulation for reliability analysis of CMOS VLSI circuits", vol. 10, Issue 11, Computer-Aided Design of Integrated Circuits and Systems, IEEE Transactions on http://ieeexplore.ieee.org/stamp/stamp.jsp?arnumber=97616 (Obtained from the Internet on Dec. 21, 2011) Nov. 1991, pp. 1372-1381.

Najm, F. N., "Low-pass filter for computing the transition density in digital circuits", vol. 13, Issue 9, Computer-Aided Design of Integrated Circuits and Systems, IEEE Transactions on http://ieeexplore.ieee.org/stamp/stamp.jsp?arnumber=310901 (Obtained from the Internet on Dec. 21, 2011) Sep. 1994, pp. 1123-1131.

Najm, F. N., "Transition density: a new measure of activity in digital circuits", vol. 12, Issue 2 Computer-Aided Design of Integrated Circuits and Systems, IEEE Transactions on http://ieeexplore.ieee.org/stamp/stamp.jsp?tp=&arnumber=205010 (Obtained from the Internet on Dec. 21, 2011) Feb. 1993, pp. 310-323.

Raja, Tezaswi et al., "Minimum dynamic power CMOS circuit design by a reduced constraint set linear program", VLSI Design, 2003. Proceedings. 16th International Conference on http://ieeexplore.ieee.org/stamp/stamp.jsp?arnumber=1183188 (Obtained from the Internet on Dec. 21, 2011) Jan. 4-8, 2003, pp. 527-532.

Raja, Tezaswi et al., "Variable input delay CMOS logic for low power design", VLSI Design, 2005. 18th International Conference on http://ieeexplore.ieee.org/stamp/stamp.jsp?arnumber=1383340 (Obtained from the Internet on Dec. 21, 2011) Jan. 3-7, 2005, pp. 598-605.

Wang, L. et al., "Fast dynamic power estimation considering glitch filtering", SOC Conference, 2009. SOCC 2009. IEEE International Sep. 9-11, 2009, pp. 361-364.

Wang, L. et al., "On Glitch Power Reduction", SOC Conference (SOCC), 2011 IEEE International Nov. 21, 2011, pp. 24-29.

U.S. Appl. No. 13/365,961, filed Feb. 3, 2012, Buechner, Thomas et al.

U.S. Appl. No. 13/365,972, filed Feb. 3, 2012, Buechner, Thomas et al.

"U.S. Appl. No. 13/365,961 Office Action", Mar. 12, 2013, 24 pages.

* cited by examiner

GATE CONFIGURATION DETERMINATION AND SELECTION FROM STANDARD CELL LIBRARY

CROSS-REFERENCE TO RELATED APPLICATION

This application claims priority under 35 U.S.C. 119 from European Patent Application No. EP11155645 filed Feb. 23, 2011, the entire contents of which are incorporated herein by reference.

BACKGROUND

Embodiments relate in general to the field of developing integrated electrical circuits, and in particular to a method for determining and selecting gate configuration from standard cell library, method for reducing power consumption of an electronic circuit, and a system for determining and selecting gate configuration from standard cell library. Still more particularly, embodiments relate to a data processing program and a computer program product for determining and selecting gate configuration from standard cell library and for reducing power consumption of an electronic circuit.

In CMOS technology, glitch power dissipated in combinational circuits owns an important portion of the total dynamic power consumption. A State-of-the-Art method for power estimation is called Monte Carlo Simulation (MCS). For this technique, a digital simulator and information about gate and interconnect delays are necessary. The runtime of MCS is high.

Statistical Methods (SM), e.g. IMS-PE, CREST, TPS, are also extensively investigated techniques. SMs are like one-period simulation using a special gate model which requires signal probabilities instead of multi-valued logic. It's faster than Monte Carlo simulation. The nature of SM is like a one-period digital simulation. Therefore, its runtime is still not low enough. In the lack of consideration of correlations the accuracy is also limited. Test cases have shown that especially the estimated power on the nets near the POs may show up to 400% error.

In VLSI design, great attention is paid to the power consumption of circuits. Research covers power estimation and power optimization from system to electrical level. The challenge of lower-level power estimation is to find a reasonable trade-off between computational effort and accuracy of power estimation. For instance, the tools based on SMs can estimate the dynamic power of combinational circuits very efficiently. However, they all suffer more or less from a poor accuracy. Especially, if the dynamic power per net is considered, a satisfying accuracy cannot be reached.

In CMOS circuits, power is dissipated due to the static leakage current and the dynamic current caused by signal transition. During the signal transition a dynamic current flows through the transistor and charges or discharges the parasitic capacitances. The appropriate power is called dynamic power. It can be modeled according to equation (1):

$$P_{dynamic} = \sum_n \frac{1}{2} V_{dd}^2 C_n f_c \alpha_n \qquad (1)$$

Wherein $V_{dd}$, $f_c$, $C_n$ and $\alpha_n$ are supply voltage, clock frequency, net capacitance and signal transition rate, respectively. It is obvious that besides scaling down supply voltage and clock frequency, one can also reduce the product of transition rate and net capacitance or either of them to reduce dynamic power.

In combinational circuits, signals are expected to change at most once in one clock period. However, there are almost always unnecessary signal transitions, which are called glitches. If the timing conditions such as setup-time and hold-time of the registers are satisfied, the circuit can still work. However, the signal transition rate $\alpha_n$ is increased due to the glitches, and therefore more power is consumed by the unnecessary signal transitions. If glitches can be eliminated, dynamic power is reduced. Glitches are caused by different arrival times of signals at the inputs of the gate.

Algorithms were proposed to optimize dynamic power consumption. For full-custom design, power optimization algorithms can result in a glitch-free design. A conventional technique is called path balancing. Besides, hazard filtering is another technique proposed which can be considered as an extension of path balancing. It shows that it is not necessary to balance the signal path exactly to eliminate the glitches. This technique indicates that the gate inertia can stop not only the generation but also the propagation of glitches. According to hazard filtering, a glitch free design needs to satisfy the requirement that the differences of signal arrival times at the inputs of all gates in the circuit must be less than their inertial delays.

Conventional techniques apply a zero-delay model in the simulation to reduce the number of events per period since if normal delay model (non-zero delay model) is applied in the simulation, lots of events could probably be generated in every clock period to model the circuit behavior. In applying the zero-delay model the whole simulation must be shorter, obviously, because the number of events per period is no more than the number of the gates in the circuit. However, the accuracy would be destroyed, if no further method would be employed to take care of the glitches. The papers by Alexander et al. each propose such a method that the whole Monte Carlo simulation employed zero-delay model and the neglected signal transitions in ambiguous interval is estimated.

SUMMARY

Some example embodiments include a method that comprises determining gate configuration from a standard cell library for optimizing behavior of a logic gate in an electronic circuit to be resized. The determining includes defining variables for a logic gate to be resized, that is within an electronic circuit and defining nets influenced by the logic gate to be resized. The determining includes determining constraints relative to other logic gates in the electronic circuit affected by the logic gate to be resized and formulating objective function to be solved by the electronic circuit. The determining includes solving the objective function using a linear programming solver based on the defined variables and the determined constraints. The determining includes outputting solving of the objective function obtained by linear programming solver for further processing. The method also includes selecting gate configuration from the standard cell library for optimizing behavior of the logic gate to be resized based on solving of the objective function.

BRIEF DESCRIPTION OF THE DRAWINGS

Inventive features regarded as the characteristics of the present inventive subject matter are set forth in the Summary of the Inventive subject matter and the appended claims.

However, the present inventive subject matter, its implementation mode, other objectives, features and advantages will be better understood through reading the following detailed description of the exemplary embodiments with reference to the accompanying drawings, wherein.

DESCRIPTION OF EMBODIMENTS

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
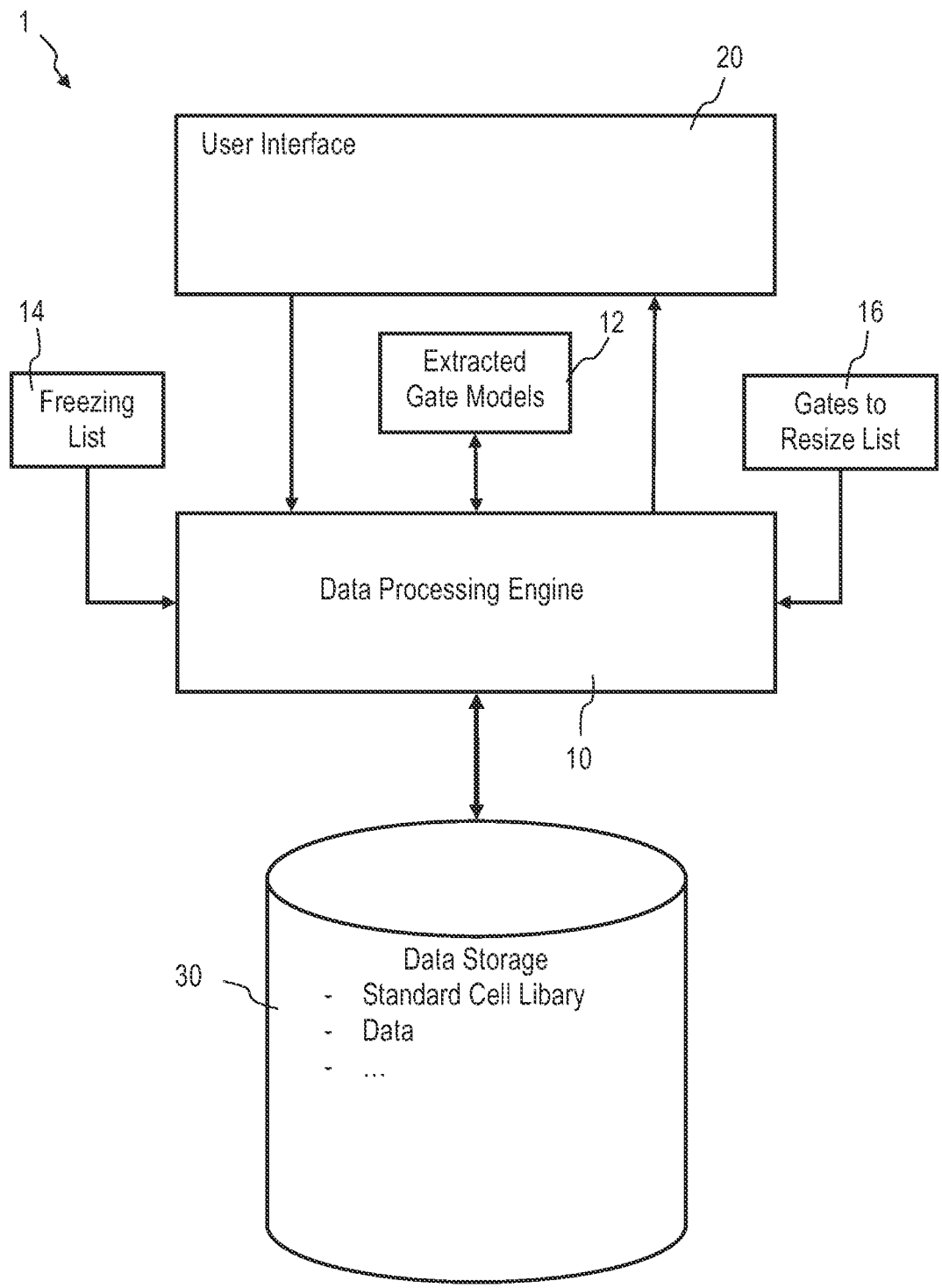
FIG. 1 depicts a schematic block diagram of a system for determining and selecting gate configuration from standard cell library, according to some example embodiments.
Figure 5:
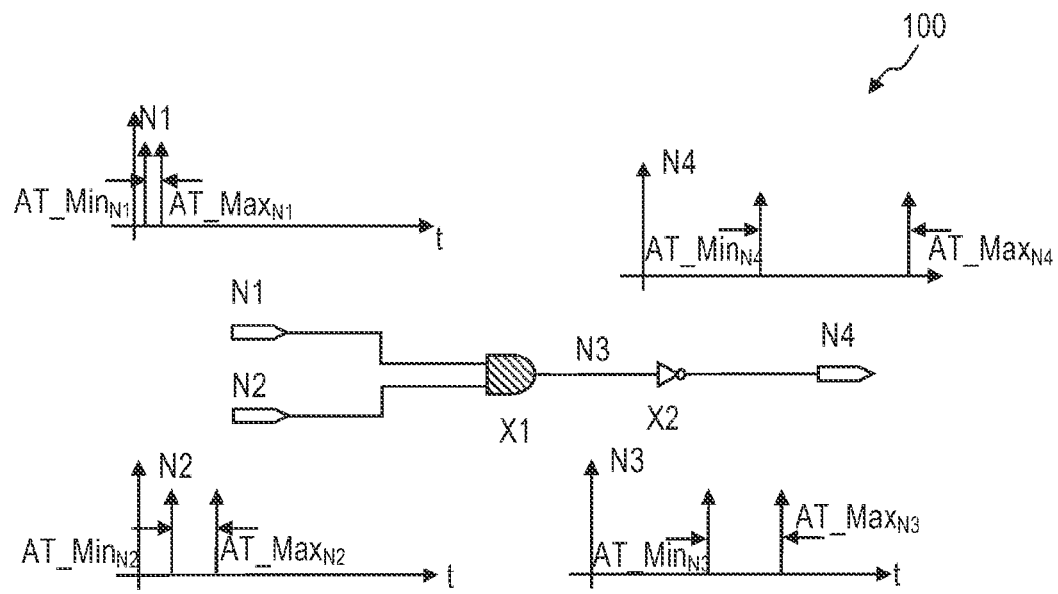
FIG. 5 depicts a circuit diagram of an embodiment of an electrical circuit to evaluate with corresponding waveform diagrams to explain definition of variables and constraints for linear programming, according to some example embodiments.

FIG. 1 shows a system 1 for determining and selecting gate configuration from standard cell library, according to some example embodiments. FIG. 5 shows an embodiment of an electrical circuit to evaluate comprising exemplary a logic cone 100 and two logic gates X1, X2, wherein a first logic gate X1 is to be resized during the optimization process.

Referring to FIG. 1 the shown embodiment employs a system 1 for determining and selecting gate configuration from standard cell library. An Embodiment of such an electronic circuit to evaluate is shown exemplary in FIG. 5 and comprises at least one cone 100 with at least one gate X1, X2 having a single output net N3, N4 only, wherein representations of the at least one gate X1, X2 are instances of elements from a standard cell library.

The shown system 1 for determining and selecting gate configuration from standard cell library is represented by a computing environment and comprises a user interface 20 for managing I/O functions of the system 1, a data storage 30 for storing computer usable program code, the standard cell library, data, etc., and a data processing engine 10 in electronic communication with the user interface 20 and the data storage 30. According to some example embodiments, the data processing engine 10 defines variables for the logic gate X1 to be resized and every net N3, N4 influenced by the logic gate X1 to be resized; determines constraints relative to logic gates X2 influenced by the logic gate X1 to be resized; formulates objective function to be solved; solves the objective function using a linear programming solver based on the defined variables and the determined constraints; and outputs solution obtained by the linear programming solver for further processing.

Figure 2:
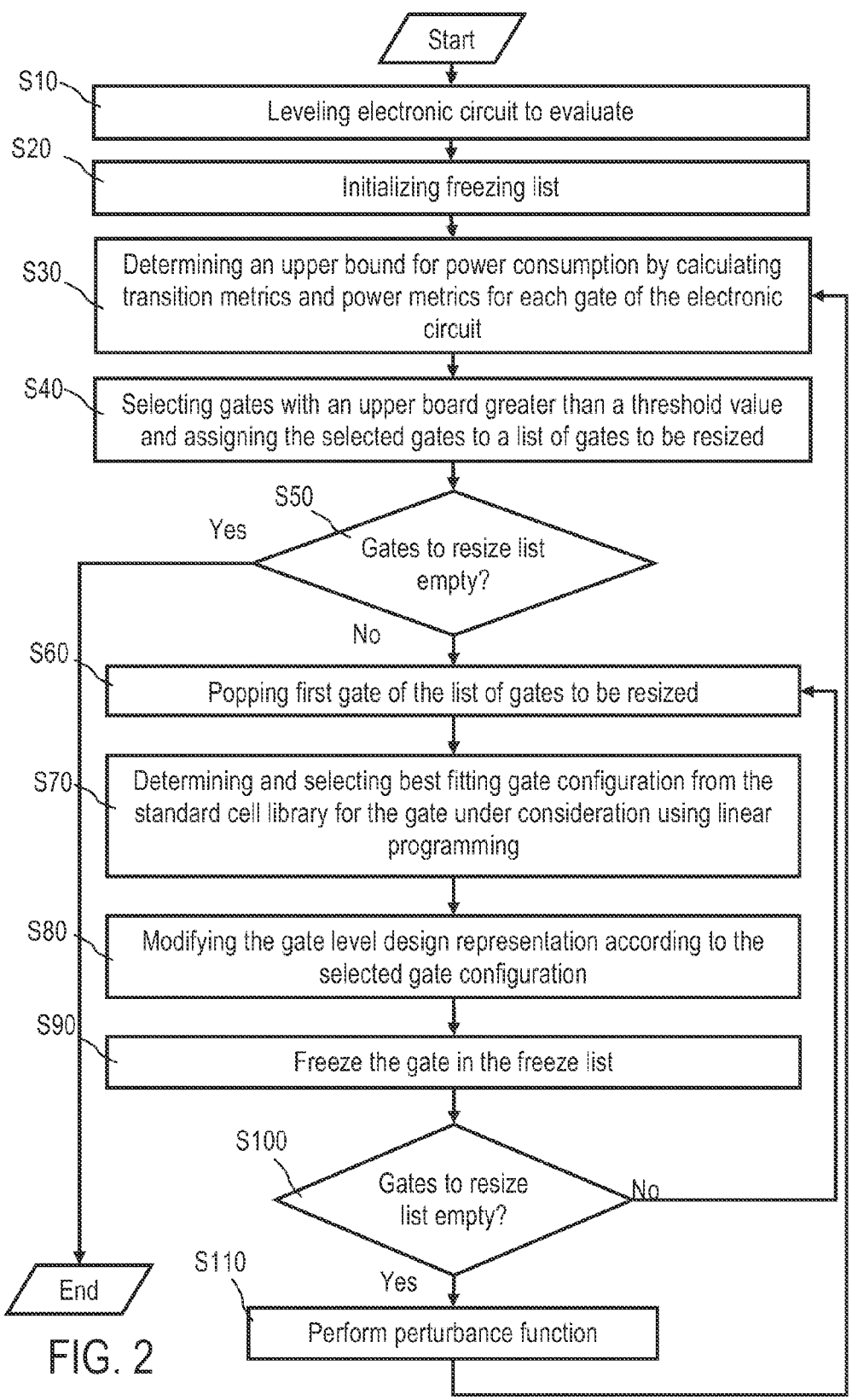
FIG. 2 depicts a schematic flow chart of a method for reducing power consumption of an electronic circuit, according to some example embodiments.
Figure 3:
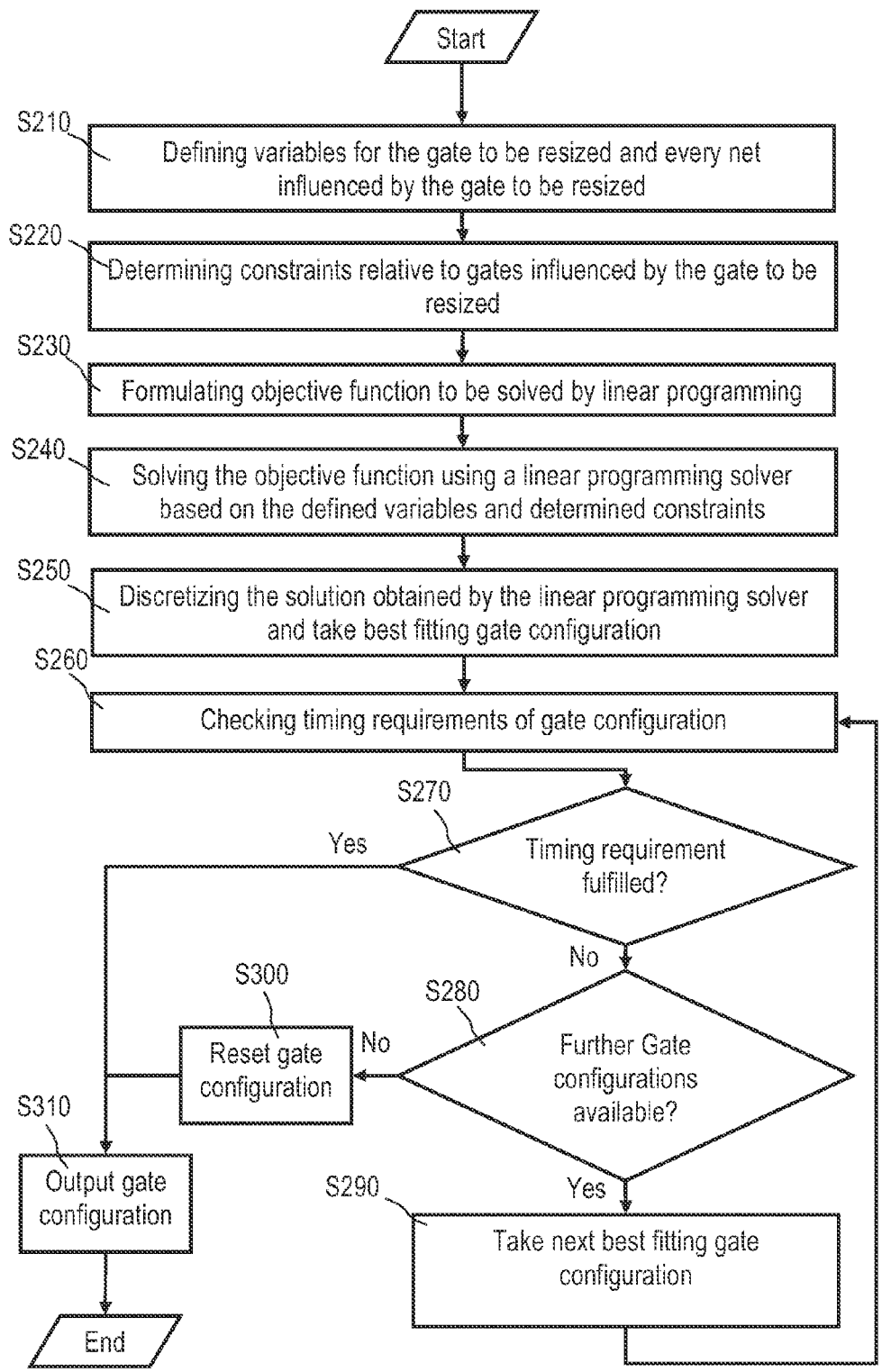
FIG. 3 depicts a schematic flow chart of a method for determining and selecting gate configuration from standard cell library, according to some example embodiments.
Figure 4:
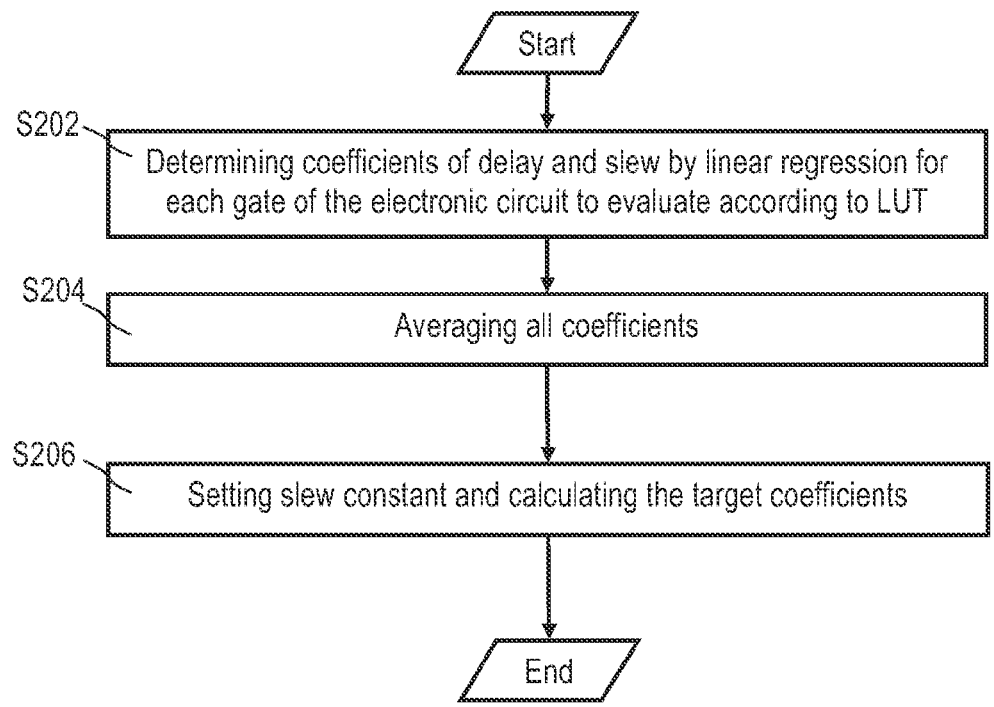
FIG. 4 depicts a schematic flow chart of a method for gate model extraction, according to some example embodiments.

FIG. 2 shows a method for reducing power consumption of an electronic circuit, according to some example embodiments. The method of reducing power consumption of an electronic circuit may also be performed by the system shown in FIG. 1. FIG. 3 shows a method for determining and selecting gate configuration from standard cell library, according to some example embodiments; used during performing the method of reducing power consumption of an electronic circuit according to FIG. 2. FIG. 4 shows a method for gate model extraction, according to some example embodiments; used before performing the method for determining and selecting gate configuration from standard cell library according to FIG. 3.

Referring to FIG. 2 the shown embodiment employs a method for reducing power consumption of an electronic circuit using a gate-level design description, wherein an embodiment of such an electronic circuit to evaluate is shown exemplary in FIG. 5 and comprise at least one cone 100 with at least one gate X1, X2 having a single output net N3, N4, only, wherein representations of the at least one gate X1, X2 are instances of elements from a standard cell library.

According to some example embodiments, in step S10 the electronic circuit to evaluate is levelized by sorting the gates X1, X2, in the electronic circuit in different levels according to their logic depth; and in step S20 a freezing list 14 is initialized, shown in FIG. 1. In step S30 an upper bound for dynamic power consumption is determined by calculating transition metrics and power metrics for each gate X1, X2 in the electronic circuit. In step S40 gates, here gate X1, with an upper bound for power consumption greater than a predetermined threshold value are selected and assigned to a gates to resize list 16, shown in FIG. 1. Query S50 checks if the gates to resize list 16 is empty. If the gates to resize list 16 is empty the method is finished. If the gates to resize list 16 is not empty the first gate X1 of the gates to resize list 16 is popped in step S60. In step S70 best fitting gate configurations from the standard cell library for the gate X1 under consideration is determined and selected by using linear programming. According to some example embodiments, this is done by performing the method for determining and selecting gate configuration from standard cell library for optimizing behavior of the logic gate X1 to be resized explained in the following referring to FIGS. 3 and 4. In step S90 the gate-level design representation is modified according to the selected gate configuration. In step S90 the gate X1 under consideration is added to the freezing list 14 after testing. Query S100 checks if the gates to resize list 16 is empty. If the gates to resize list 16 is not empty the optimizing process returns to step S60. If the gates to resize list 16 is empty a perturbance function is performed in step S110. The perturbance function is implemented to prevent the solution from a local optimum and to release randomly some gates frozen in the freezing list 14 after all selected gates are resized. The gates newly pushed into the freezing list 12 are much more likely to be released than the gates that stay in the freezing list for a long time. With the increase of optimization steps, the number of gates that are allowed to be released from the freezing list decreases as well. After such a stochastic decision the method returns to step S30 and a new gates to resize list 16 is determined. The optimization procedure runs until the gates to resize list 16 is empty. If no gates are written to the new gates to resize list 16, because the upper bound for power consumption of all gates X1, X2 of the electronic circuit is smaller than the predetermined threshold value, an empty gates to resize list 16 is generated and the optimization procedure is finished.

The transition metric of an output net N3 of the gate X1 to be resized is defined as minimum value between a sum of signal transitions at input nets N1, N2 of the gate X1 to be resized and a component dependent on a glitch window defined as difference between latest and earliest signal arrival times AT_MaxN3, AT_MinN3 at the output net N3 of the gate X1 to be resized and an inertial delay of the gate X1 to be resized.

Further extracting gate model for each gate X1, X2 of the electronic circuit to evaluate is performed according to the method shown in FIG. 4. Referring to FIG. 4, in step S202 coefficients of delays and slews defined by equation (2) and (3) are determined by linear regression for all cells according to Look-up table (LUT).

$$\text{Delay} = \alpha_d C_L + \beta_d S_{in} + \gamma_d C_L S_{in} + \tau_d \quad (2)$$

$$\text{Slew}_{out} = \alpha_s C_L + \beta_s S_{in} + \gamma_s C_L S_{in} + \gamma_s \quad (3)$$

Wherein CL is the net capacitance in the circuit and $\alpha_d$, $\beta_d$, $\gamma_d$, $\tau_d$, $\alpha_s$, $\beta_s$, $\gamma_s$, $\tau_s$ are parameters of this gate model. The parameters can be determined from look-up table (LUT) stored in the standard technology library.

Delays and slews in LUT are related with paths from input to output. The coefficients of the whole gate need to be calculated by averaging the coefficients obtained for every path. E.g. Gate AND2_X_A12TR has four LUTs for one drive strength. The coefficients of rising and falling transitions are determined by linear regression and averaged. In step S204 all coefficients are averaged. E.g. Gate AND2_X_A12TR has 10 various drive strengths from _X0P5M_(0,5) to _X11M_(11) so ten groups of coefficients are averaged. For the gates with different drive strengths correlation (4) and (5) are used.

$$\alpha_d, \gamma_d, \alpha_s, \gamma_s \propto 1/s \quad (4)$$

Wherein 1/s represents drive strength or speed factor S=1/s, e.g. 0.7 for INV_X0P7M A12TR in CU45.

$$\beta_d, \tau_d, \beta_s, \tau_s \approx \text{const.} \quad (5)$$

By defining the speed factor S or drive strength 1/s the gate model can be generalized with equations (6) and (7).

$$\text{Delay} = \overline{\alpha}_d C_L \frac{1}{s} + \overline{\beta}_d S_{in} + \overline{\gamma}_d C_L S_{in} \frac{1}{s} + \overline{\tau}_d \quad (6)$$

$$\text{Slew}_{out} = \overline{\alpha}_s C_L \frac{1}{s} + \overline{\beta}_s S_{in} + \overline{\gamma}_s C_L S_{in} \frac{1}{s} + \overline{\tau}_s \quad (7)$$

Other parameters are determined according to equations (8) to (15)

$$\overline{\alpha}_d = E[\alpha_d s] \quad (8)$$

$$\overline{\beta}_d = E[\beta_d] \quad (9)$$

$$\overline{\gamma}_d = E[\gamma_d s] \quad (10)$$

$$\overline{\tau}_d = E[\tau_d] \quad (11)$$

$$\overline{\alpha}_s = E[\alpha_s s] \quad (12)$$

$$\overline{\beta}_s = E[\beta_s] \quad (13)$$

$$\overline{\gamma}_s = E[\gamma_s s] \quad (14)$$

$$\overline{\tau}_s = E[\tau_s] \quad (15)$$

In step S206 slew parameters are set constant and target coefficients are calculated by linearization of the generalized gate model. Equations (16) to (21) show the result of the gate model extraction written to block 12, shown in FIG. 1.

$$\text{Delay} = k_d C_L \frac{1}{s} + b_d \quad (16)$$

$$\text{Slew}_{out} = k_s C_L \frac{1}{s} + b_s \quad (17)$$

$$k_d = (\overline{\alpha}_d + \overline{\gamma}_d S_{in_{const}}) \quad (18)$$

$$b_d = (\overline{\beta}_d S_{in_{const}} + \overline{\tau}_d) \quad (19)$$

$$k_s = (\overline{\alpha}_s + \overline{\gamma}_s S_{in_{const}}) \quad (20)$$

$$b_s = (\overline{\beta}_s S_{in_{const}} + \overline{\tau}_s) \quad (21)$$

Referring to FIG. 3 the shown embodiment employs a method for determining and selecting gate configuration from standard cell library for optimizing behavior of a logic gate X1 in an electronic circuit 100 to be resized.

In step S210 variables for the logic gate X1 to be resized and every net N3, N4 influenced by the logic gate X1 to be resized are defined. For example, for every net N3, N4 influenced by the logic gate X1 to be resized a latest arrival time AT_Max$_{N3}$, AT_Max$_{N4}$, and an earliest arrival time AT_Min$_{N3}$, AT_Min$_{N4}$ are defined as variables. For logic gate X1 to be resized drive strength 1/s or speed factor S is defined as variable.

In step S220 constraints relative to logic gates X2 influenced by the logic gate X1 to be resized are determined. The constraints restrict timing behavior at the output N3, N4 of the involved gates. For example, latest arrival time AT_Max$_{N3}$, AT_Max$_{N4}$ at the output N3, N4 must not be less than the latest arrival time AT_MaxN1, AT_Max$_{N2}$, AT_Max$_{N3}$ at any input N1, N2, N3 plus a gate delay d. Earliest arrival time AT_Min$_{N3}$, AT_Min$_{N4}$ at the output N3, N4 must not be greater than the earliest arrival time AT_Min$_{N1}$, AT_Min$_{N2}$, AT_Min$_{N3}$, AT_Min$_{N4}$ at any input N1, N2, N3 plus gate delay d. Latest arrival time AT_Max must not be less than earliest arrival time AT_Min.

In step S230 objective function to be solved by linear programming is formulated. The objective function is a sum of power metrics at all involved nets N3, N4 according to correlation (22):

$$\Sigma PM_i, i \in \{\text{nets}\} \quad (22)$$

Equation (23) defines a simplification of the power metric:

$$PM_i = \frac{(\text{AT\_Max}_i - \text{AT\_Min}_i) C_L}{d} \quad (23)$$

Wherein i represent output net of a gate and d represents gate delay. Linearization of the simplified power metric is represented by equation (24) and (25). The linearization and equations (24) and (25) are only used for the logic gate X1 to be resized. For gates X2 not to be resized Equation (23) is used.

$$PM_i = \quad (24)$$
$$(\text{AT\_Max}_i - \text{AT\_Min}_i) C_L \left[ \frac{1}{k_d C_L S_0 + b_d} - \frac{k_d C_L}{k_d C_L S_0 + b_d^2} (S - S_0) \right]$$

$$PM_i \approx (\text{AT\_Max}_i - \text{AT\_Min}_i)C_L\left[\frac{1}{k_d C_L S_0 + b_d} + \frac{k_d C_L S_0}{(k_d C_L S_0 + b_d)^2}\right] - \frac{k_d C_L^2 GW}{(k_d C_L S_0 + b_d)^2}S \quad (25)$$

Wherein S0 represents speed factor of the gate in concurrent design, and GW represents glitch window of the gate in concurrent design. The glitch window GW is defined as difference between latest arrival time AT_Max and earliest arrival time AT_Min at a net N1, N2, N3, N4.

In step S240 the objective function is solved by using a linear programming solver based on the defined variables and determined constrains. In step S250 the solution obtained by the linear programming solver is discretized and the best fitting gate configuration is taken. The outputted solution obtained by the linear programming solver is continuous. The optimal speed factor for X1 is 0.0937, and the corresponding drive strength is 1/0.0937=10.6724 for example. Since only gates with discrete drive strength exist in the standard cell library, the optimal drive strength is rounded to the available drive strength in standard cell library by using Euclidian distance, for example.

In step S260 the timing requirements of the selected gate configuration are checked. Query 270 branches to step S310, if the time requirements are fulfilled and branches to query S280, if the time requirements are not fulfilled. Query S280 checks if further gate configurations are available and branches to step S300, if no further gate configurations are available, and branches to step S290, if further gate configurations are available. In Step S290 next best fitting gate configuration is taken and then the method is continued with step S260. In step S300 the gate configuration is reset. In step S310 the selected gate configuration is outputted.

In view of the exemplary electronic circuit 100 shown in FIG. 5 the optimal drive strength of logic gate X1 is to be determined. In the shown embodiment of the electronic circuit 100 N1 and N2 denote primary inputs and N4 denotes a primary output. According to the method for determining and selecting gate configuration from standard cell library the latest arrival time AT_Max and the earliest arrival time AT_Min are defined for every net N3, N4 influenced by the resizing gate X1. For the primary inputs N1, N2 no variables are determined since nets N1, N2 are not influenced by the resizing gate X1. The speed factor: S=1/s is defined as variable for the logic gate X1 under investigation. The constraints are determined relative to the logic gate X2 influenced by the logic gate X1. The constraints restrict the timing behavior at the output N3, N4 of the involved gates X1, X2.

The constraints for the logic gate X1 are defined for late mode timing according to correlations (26) and (27):

$$\text{AT\_Max}_{N3} \geq \text{AT\_Max}_{N1} + d_{X1} \quad (26)$$

$$\text{AT\_Max}_{N3} \geq \text{AT\_Max}_{N2} + d_{X1} \quad (27)$$

The constraints for the logic gate X1 are defined for early mode timing according to correlations (28) and (29):

$$\text{AT\_Min}_{N3} \leq \text{AT\_Min}_{N1} + d_{X1} \quad (28)$$

$$\text{AT\_Min}_{N3} \leq \text{AT\_Min}_{N2} + d_{X1} \quad (29)$$

The constraints for the logic gate X2 are defined for late mode timing according to correlation (30):

$$\text{AT\_Max}_{N4} \leq \text{AT\_Max}_{N3} + d_{X2} \quad (30)$$

The constraints for the logic gate X2 are defined for early mode timing according to correlation (31):

$$\text{AT\_Min}_{N4} \leq \text{AT\_Min}_{N3} + d_{X2} \quad (31)$$

All constraints are written in a standard format, since this is required by the LP-Solver.

The objective function in example is the sum of simplified power metric according to equation (32) at the nets N3 and N4 involved due to resizing.

$$\Sigma PM_{Ni} = PM_{N3} + PM_{N4} \quad (32)$$

For output net N3 of the logic gate X1 to be resized equation (24) and (25) are used:

$$PM_{N3} = (\text{AT\_Max}_{N3} - \text{AT\_Min}_{N3}) \quad (24)$$
$$C_L\left[\frac{1}{k_d C_L S_{X1_0} + b_d} - \frac{k_d C_L}{k_d C_L S_{S1_0} + b_d^2}(S_{X1} - S_{X1_0})\right]$$

$$PM_{N3} \approx (\text{AT\_Max}_{N3} - \text{AT\_Min}_{N3}) \quad (25)$$
$$C_L\left[\frac{1}{k_d C_L S_{X1_0} + b_d} + \frac{k_d C_L S_{X1_0}}{(k_d C_L S_{X1_0} + b_d)^2}\right] - \frac{k_d C_L^2 GW}{(k_d C_L S_{X1_0} + b_d)^2}S_{X1}$$

For output net N4 of the involved logic gate X2 equation (23) is used:

$$PM_{N4} = \frac{(\text{AT\_Max}_{N4} - \text{AT\_Min}_{N4})C_L}{d} \quad (23)$$

Example embodiments for determining and selecting gate configuration from standard cell library and the inventive method for reducing power consumption of an electronic circuit can be implemented as an entirely software embodiment, or an embodiment containing both hardware and software elements. Some example embodiments are implemented in software, which includes but is not limited to firmware, resident software, microcode, etc.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for movement reduction as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, by a processor, a power consumption for a number of logic gates in an electronic circuit that exceeds a threshold value;
    selecting a logic gate of the number of logic gates to be resized in response to determining the power consumption for the logic gate exceeds the threshold value; and
    determining, from a library, a gate configuration for the logic gate to be resized, the determining the gate configuration to be resized comprising,
        defining at least one variable for the logic gate to be resized, wherein the at least one variable comprises at least one of to be resized and a speed factor of the logic gate to be resized;
        defining at least one net influenced by the logic gate to be resized;
        determining at least one constraint relative to other logic gates of the number of logic gates in the electronic circuit affected by the logic gate to be resized, wherein the at least one constraint comprises timing at an output at the at least one net;
        formulating an objective function, wherein the objective function comprises a formulation of a sum of power metrics at the at least one net influenced by the logic gate to be resized;
        solving the objective function based on the at least one variable and the at least one constraint; and
        selecting the gate configuration from the library for the logic gate to be resized based on the solved objective function.

2. The method of claim 1, wherein the determining a gate configuration comprises defining a latest arrival time and an earliest arrival time as variables for the at least one net influenced by the logic gate to be resized.

3. The method of claim 2, wherein the at least one constraint comprises a restriction of at least one of a latest arrival time and an earliest arrival time at the output of the at least one net.

4. The method of claim 1, wherein the determining a gate configuration comprises:
  identifying involved logic gates among the number of logic gates, the involved logic gates comprising logic gates of the number of logic gates influenced by the logic gate to be resized;
  simplifying the power metrics at output nets of the involved logic gates; and
  linearizing the simplified power metrics at an output net of the logic gate to be resized.

5. The method of claim 4, wherein the at least one variable comprises the drive strength of the logic gate to be resized, wherein the determining a gate configuration comprises,
  outputting the drive strength for the logic gate to be resized as a continuous solution;
  rounding the continuous solution of the drive strength to an available drive strength in the library;
  selecting a gate configuration with the available drive strength in the library for the logic gate to be resized; and
  checking whether the selected gate configuration is breaking the at least one constraint.

6. The method of claim 5, wherein the determining a gate configuration comprises:
  responsive to the selected gate configuration breaking the at least one constraint,
    selecting a different gate configuration with a different drive strength; and
    checking whether the selected different gate configuration is breaking the at least one constraint.

7. The method of claim 6, wherein the determining a gate configuration comprises resetting the gate configuration after the selected gate configuration with the available drive strength is breaking the at least one constraint and the selected different gate configuration with the different drive strength is breaking the at least one constraint.

8. A computer program product for reducing a power consumption of an electronic circuit, the computer program product comprising:
  a computer readable storage device having computer usable program code embodied therewith, the computer usable program code, when executed by a processor, causes the processor to:
    reduce the power consumption of the electronic circuit using a gate-level design representation, wherein the electronic circuit comprises a number of gates, wherein the electronic circuit comprises at least one logic cone with at least one gate of the number of gates that includes a single output net, wherein representations of the at least one gate are instances of elements from a library, wherein the processor configured to reduce the power consumption of the electronic circuit comprises configuring the processor to:
      determine an upper bound for the power consumption based on calculations of transition metrics and power metrics for each gate of the number of gates in the electronic circuit;
      select at least one gate of the number of gates with the upper bound for a power consumption greater than a threshold value;
      for the at least one selected gate, perform the following operations:
        determine a gate configuration from the library for the at least one selected gate, wherein the processor configured to determine the gate configuration comprises configuring the processor to:
          define at least one variable for the at least one selected gate;
          define at least one net influenced by the at least one selected gate;
          determine at least one constraint relative to other gates of the number of gates in the electronic circuit affected by the at least one selected gate;
          formulate an objective function;
          solve the objective function based on the at least one variable and the at least one constraint;
          select a gate configuration for the at least one selected gate based on the solved objective function; and
        modify the gate-level design representation according to the selected gate configuration.

9. The computer program product of claim 8, wherein a transition metric for the at least one gate is defined as a minimum value between a sum of signal transitions at input nets of the at least one gate and a component dependent on a glitch window defined as a difference between a latest signal arrival time and an earliest signal arrival time at an output net of the at least one gate and an inertial delay of the at least one gate.

10. The computer program product of claim 8, wherein the processor is configured to extract a gate model for each gate of the number of gates of the electronic circuit to evaluate by operations to,
  determine coefficients of delay and slew by a linear regression;
  determine a gate coefficient for each gate based on an average of the coefficients of the delay and the slew;
  set slew parameters of each gate to constant; and
  calculate, after the slew parameters of each gate are set to constant, target coefficients of each gate based on the gate coefficient.

11. An apparatus comprising:
  a processor;
  a data processing engine executable on the processor, the data processing engine configured to,
    determine a power consumption for a number of logic gates in an electronic circuit that exceeds a threshold value;
    select a logic gate of the number of logic gates to be resized in response a determination that the power consumption for the logic gate exceeds the threshold value;
    determine, from a library, a gate configuration for the logic gate to be resized, wherein as part of the data processing engine configured to determine the gate configuration, the data processing engine is configured to,
      define at least one variable for the logic gate to be resized, wherein the at least one variable comprises at least one of a drive strength and a speed factor of the logic gate to be resized;
      define at least one net influenced by the logic gate to be resized;
      determine at least one constraint relative to other logic gates of the number of logic gates in the electronic circuit affected by the logic gate to be resized, wherein the at least one constraint comprises timing at an output at the at least one net;
      formulate an objective function, wherein the objective function comprises a formulation of a sum of power metrics at the at least one net influenced by the logic gate to be resized;
      solve the objective function based on the at least one variable and the at least one constraint; and select the gate configuration from the library for the logic gate to be resized based on the solved objective function.

12. The apparatus of claim 11, wherein, as the part of the data processing engine configured to determine the gate configuration, the data processing engine is configured to define a latest arrival time and an earliest arrival time as variables for the at least one net influenced by the logic gate to be resized.

13. The apparatus of claim 12, wherein the at least one constraint comprises a restriction of at least one of a latest arrival time and an earliest arrival time at the output of the at least one net.

14. The apparatus of claim 13, wherein, as the part of the data processing engine configured to determine the gate configuration, the data processing engine is configured to,
   identify involved logic gates among the number of logic gates, the involved logic gates comprising logic gates of the number of logic gates influenced by the logic gate to be resized;
   simplify the power metrics at output nets of the involved logic gates; and
   linearize the simplified power metrics at an output net of the logic gate to be resized.

15. The apparatus of claim 14, wherein the at least one variable comprises the drive strength of to be resized, wherein, as the part of the data processing engine configured to determine the gate configuration, the data processing engine is configured to,
   output the drive strength for the logic gate to be resized as a continuous solution;
   round the continuous solution of the drive strength to an available drive strength in the library;
   select a gate configuration with the available drive strength in the library for the logic gate to be resized; and
   check whether the selected gate configuration is breaking the at least one constraint.

16. The apparatus of claim 15, wherein, as the part of the data processing engine configured to determine the gate configuration, the data processing engine is configured to,
   responsive to the selected gate configuration breaking the at least one constraint,
      select a different gate configuration with a different drive strength; and
      check whether the selected different gate configuration is breaking the at least one constraint.

* * * * *